United States Patent
Sasao et al.

(10) Patent No.: US 8,483,198 B2
(45) Date of Patent: Jul. 9, 2013

(54) COMMUNICATION TERMINAL AND CONTROL METHOD

(75) Inventors: Nobuaki Sasao, Tokyo (JP); Jun Hashimoto, Tokyo (JP); Hisashi Takeshita, Tokyo (JP); Kentaro Itagaki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 434 days.

(21) Appl. No.: 12/788,817

(22) Filed: May 27, 2010

(65) Prior Publication Data

US 2010/0316031 A1  Dec. 16, 2010

(30) Foreign Application Priority Data

Jun. 12, 2009  (JP) ................................ 2009-141140

(51) Int. Cl.
*H04W 4/00*  (2009.01)

(52) U.S. Cl.
USPC ..... 370/338; 455/434; 455/432.1; 455/432.2; 455/433

(58) Field of Classification Search
USPC ................ 455/434, 432.1, 432.2, 432.3, 433, 455/435.1, 435.2, 451.1, 456.2, 456.5, 456.6, 455/457, 452
See application file for complete search history.

(56) References Cited

U.S. PATENT DOCUMENTS

| | | | |
|---|---|---|---|
| 2004/0214539 A1 | 10/2004 | Rajamani et al. | |
| 2006/0009219 A1 | 1/2006 | Jaakkola et al. | |
| 2006/0135067 A1* | 6/2006 | Dunko | 455/41.2 |
| 2008/0014934 A1* | 1/2008 | Balasubramanian et al. | 455/434 |

FOREIGN PATENT DOCUMENTS

| | | |
|---|---|---|
| CN | 101002484 A | 7/2007 |
| CN | 101084646 A | 12/2007 |
| JP | 2000197118 | 7/2000 |
| JP | 2002247646 | 8/2002 |
| JP | 2003-512768 A | 4/2003 |
| JP | 2003111123 | 4/2003 |
| JP | 2004048147 | 2/2004 |
| JP | 2004179826 | 6/2004 |
| JP | 2004274723 | 9/2004 |
| JP | 2008-524922 A | 7/2008 |
| JP | 2008-227590 A | 9/2008 |
| WO | 01/30025 A1 | 4/2001 |
| WO | 2005048632 A1 | 5/2005 |
| WO | 2006/068661 A1 | 6/2006 |
| WO | 2006068661 A1 | 6/2006 |

OTHER PUBLICATIONS

Japanese Office Action for JP Patent Application No. 2009-141140 dated May 31, 2011.
European Office Action for EP Patent Application No. 10165060.4 dated Sep. 15, 2011.
European Office Action for EP 10 165 060.4-2414 dated Oct. 29, 2010.
European Search Report for EP10165060.4-2414, dated Oct. 8, 2010.
European Patent Office Communication issued in the corresponding European Application No. 10165060.4 dated Sep. 14, 2012.
First Notification of Office Action issued in the corresponding Chinese Application No. 201010204120.5 dated Sep. 10, 2012.

* cited by examiner

Primary Examiner — Kamran Afshar
Assistant Examiner — Sayed T Zewari
(74) *Attorney, Agent, or Firm* — Michaud-Kinney Group LLP (57) ABSTRACT

Communication terminal 1 receives an MCC (Mobile Country Code) from a wireless base station located in one country and a wireless base station located in another country adjacent to the one country, using first communication unit 108A. Communication terminal 1 obtains from storage unit 105 setting data on a wireless LAN, which is commonly associated with the countries indicated by the received MCCs. Second communication unit 108B carries out wireless LAN communication using the obtained setting data.

6 Claims, 5 Drawing Sheets

| CHANNEL | | U.S. | EUROPE | FRANCE | SPAIN | JAPAN |
|---|---|---|---|---|---|---|
| CHANNEL NO. | CENTER FREQUENCY [GHz] | | | | | |
| 1 | 2.412 | 2 | 2 | 0 | 0 | 2 |
| 2 | 2.417 | 1 | 1 | 0 | 0 | 1 |
| 3 | 2.422 | 1 | 1 | 0 | 0 | 1 |
| 4 | 2.427 | 1 | 1 | 0 | 0 | 1 |
| 5 | 2.432 | 1 | 1 | 0 | 0 | 1 |
| 6 | 2.437 | 2 | 1 | 0 | 0 | 2 |
| 7 | 2.442 | 1 | 2 | 0 | 0 | 1 |
| 8 | 2.447 | 1 | 1 | 0 | 0 | 1 |
| 9 | 2.452 | 1 | 1 | 0 | 0 | 1 |
| 10 | 2.457 | 1 | 1 | 1 | 1 | 1 |
| 11 | 2.462 | 2 | 1 | 2 | 2 | 2 |
| 12 | 2.467 | 0 | 1 | 0 | 1 | 1 |
| 13 | 2.472 | 0 | 2 | 0 | 1 | 1 |
| 14 | 2.484 | 0 | 0 | 0 | 0 | 2 |

| MAXIMUM TRANSMISSION POWER | U.S. | EUROPE | FRANCE | SPAIN | JAPAN |
|---|---|---|---|---|---|
| 50mW | — | — | — | — | 1 |
| 100mW | 1 | 1 | 1 | 1 | 0 |

COMMUNICATION TERMINAL AND CONTROL METHOD

CROSS-REFERENCE TO RELATED APPLICATIONS

This application is based on and claims priority to Japanese Patent Application No. 2008-318748 filed on Jun. 12, 2009, the entire content of which is expressly incorporated by reference herein.

TECHNICAL FIELD

The present invention relates to a technique for changing communication settings.

BACKGROUND

In a wireless LAN (Local Area Network) complying with the IEEE 802.11b standard, available frequencies and maximum transmission power vary from country to country. Accordingly, a user using a computer with a wireless LAN function, when moving from one country to another, has to configure settings of the computer to comply with standards of the country to which the user has moved.

JP2003-111123A and JP2004-179826A disclose a device for automatically configuring such settings. In the device, a country in which the device is located is identified using a GPS (Global Positioning System), and a frequency to be used and maximum transmission power are automatically set according to the identified country.

JP2002-247646A discloses, instead of using a GPS to identify a country in which a device is located, a technique of using an MCC (Mobile Country Code) transmitted from a base station of a mobile communication network. If the technique is used instead of a GPS, since a radio wave used in a mobile communication network can be received inside a building in contrast with a radio wave used in a GPS, it is possible to identify a country if the device is located indoors, and to configure settings according to the identified country.

If an MCC transmitted from a base station of a mobile communication network is used to identify a country, a device located near a border may receive a radio wave sent from a base station located in one country and a radio wave sent from a base station located in another country. In such a case, since two MCCs are received from two countries, it is difficult to identify a country in which the device is located, using an MCC. Accordingly, it is difficult to configure wireless LAN settings according to a country in which the device is located.

The present invention has been made in view of the circumstances described above, and provides a technique for, if a device capable of performing wireless communication is located near a border between two countries, enabling the device to configure communication settings in compliance with standards of countries adjacent to the border.

SUMMARY

A first aspect of the prevent invention provides a communication terminal comprising: a first communication unit that performs wireless communication with a wireless base station that is part of a mobile communication network to receive area data from the wireless base station, the area data indicating an area in which the wireless base station is located; a second communication unit that performs wireless communication using a band frequency different from a band frequency used for wireless communication performed by the first communication unit; a storage unit that stores, for each of a plurality of areas, setting data indicating a setting on wireless communication performed by the second communication unit in each area; and an area identifying unit that, if first area data and second area data are received from different wireless base stations by the first communication unit, identifies a first area indicated by the first area data and a second area indicated by the second area data; and a common setting data obtaining unit that obtains setting data commonly associated with the first area and the second area identified by the area identifying unit, from the storage unit.

A second aspect of the present invention provides a communication terminal according to the first aspect, further comprising a setting unit that configures wireless communication settings of the second communication unit, using the setting data obtained by the common setting data obtaining unit.

A third aspect of the present invention provides a communication terminal according to the first aspect, further comprising: a measuring unit that measures a first communication quality of a radio wave that is transmitted when the first communication unit receives the first area data; and a second communication quality of a radio wave that is transmitted when the first communication unit receives the second area data; and a setting unit that: if a difference between the first communication quality and the second communication quality is smaller than a predetermined value, configuring wireless communication settings of the second communication unit, using the setting data obtained by the common setting data obtaining unit; and if the difference is equal to or larger than the predetermined value, obtaining setting data from the storage unit, that is associated with an area indicated by either the first area data or the second area data, that corresponds to a higher communication quality among the first communication quality and the second communication quality, and configuring wireless communication settings of the second communication unit, using the obtained setting data.

A fourth aspect of the present invention provides a method for controlling a communication terminal comprising: a first communication unit that performs wireless communication with a wireless base station that is part of a mobile communication network to receive area data from the wireless base station, the area data indicating an area in which the wireless base station is located; a second communication unit that performs wireless communication using a band frequency different from a band frequency used for wireless communication performed by the first communication unit; and a storage unit that stores, for each of a plurality of areas, setting data indicating a setting on wireless communication performed by the second communication unit in each area, the method comprising: if first area data and second area data are received from different wireless base stations by the first communication unit, identifying a first area indicated by the first area data and a second area indicated by the second area data; and obtaining setting data commonly associated with the identified first area and the identified second area from the storage unit.

A fifth aspect of the present invention provides a method according to the fourth aspect, further comprising configuring wireless communication settings of the second communication unit, using the obtained setting data.

A sixth aspect of the present invention provides a method according to the fourth aspect, further comprising: measuring a first communication quality of a radio wave that is transmitted when the first communication that receives the first area data; and a second communication quality of a radio wave that is transmitted when the first communication unit receives the second area data; if a difference between the first communication quality and the second communication quality is smaller than a predetermined value, configuring wireless communication settings of the second communication unit, using the obtained setting data; and if the difference is equal to or larger than the predetermined value, obtaining setting data from the storage unit, that is associated with an area indicated by either the first area data or the second area data, that corresponds to a higher communication quality among the first communication quality and the second communication quality, and configuring wireless communication settings of the second communication unit, using the obtained setting data.

According to an aspect of the present invention, if a device capable of performing wireless communication is located near a border, enabling the device to configure settings on wireless communication according to countries adjacent to the border.

BRIEF DESCRIPTION OF THE DRAWINGS

Exemplary embodiments of the present invention will be described in detail below with reference to the following figures, wherein.

DETAILED DESCRIPTION

Figure 1:
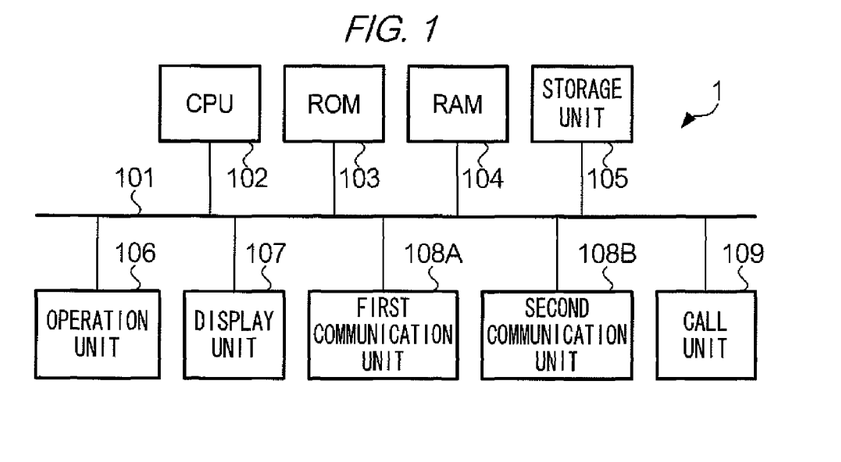
FIG. 1 is a block diagram showing a hardware configuration of communication terminal 1.

FIG. 1 is a block diagram showing a hardware configuration of communication terminal 1 according to an exemplary embodiment of the present invention. In the present exemplary embodiment, communication terminal 1 functions as a mobile phone. Specifically, communication terminal 1 performs wireless communication with a base station constituting a mobile communication network to perform voice communication or data communication. Communication terminal 1 is also provided with a function of performing communication in conformity with the IEEE 802.11b standard.

Components of communication terminal 1 are connected to bus 101, through which data is exchanged among the components.

First communication unit 108A functions as an interface for carrying out communication with a wireless base station constituting a mobile communication network. The communication unit performs wireless communication with a wireless base station via an antenna (not shown) under control of CPU 102. First communication unit 108A is also able to perform communication in conformity with a 3GPP standard such as the IMT-2000, LTE, 4G, or the GSM.

Second communication unit 108B functions as an interface for carrying out communication with a wireless LAN base station complying with the IEEE 802.11b standard. The communication unit performs wireless communication with a wireless LAN base station via an antenna (not shown) under control of CPU 102.

Call unit 109 includes a microphone and a speaker. If a voice is input to the microphone during voice communication, call unit 109 digitalizes the input voice to generate a voice signal, and outputs the voice signal to first communication unit 108A. As a result, a voice of a user is transmitted to a communication terminal of another person. In contrast, if a digitalized voice signal is input to call unit 109 from first communication unit 108A, call unit 109 converts the voice signal into an analogue signal, and outputs the analogue signal to the speaker. As a result, a voice of the other person is output and can be heard by the user.

Operation unit 106 includes plural keys such as numeric keys. If a key is pressed, operation unit 106 outputs a signal indicating the pressed key to CPU 102. On receipt of the signal, CPU 102 controls components in accordance with the pressed key.

Display unit 107 includes a liquid crystal display, and under control of CPU 102, displays characters, graphics screens, or menu screens for operating communication terminal 1.

Storage unit 105 includes a nonvolatile memory, and stores frequency table TB1 and transmission power table TB2. Frequency table TB1 and transmission power table TB2 store setting data indicating settings on wireless communication performed by second communication unit 108B.

Figure 2:
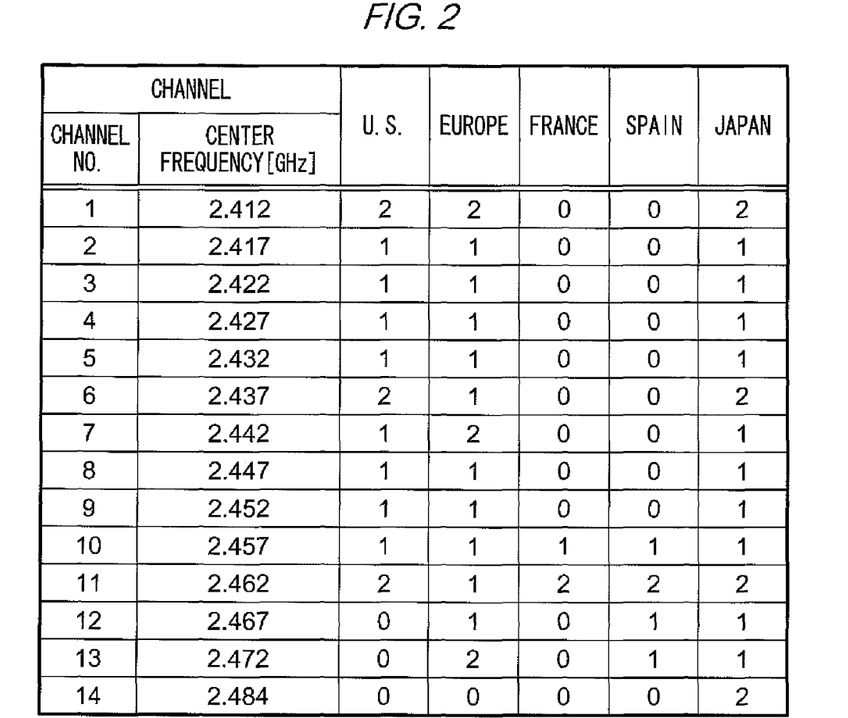
FIG. 2 is a diagram showing an example of a format of frequency table TB1.

FIG. 2 is a diagram showing an example of a format of frequency table TB 1. Frequency table TB 1 is referred to for setting a frequency of radio waves to be exchanged when second communication unit 108B performs wireless communication. In the column including channel information in the table, numbers of channels, 1 to 14, used by second communication unit 108B for performing wireless communication, and center frequencies associated with the channels are stored. In the column including country (area) information, columns for the United States, Europe, Spain, France, and Japan are provided. In these columns, a number "1" is stored in a row corresponding to a channel that can be used in the country (area), and a number "2" is stored in a row corresponding to a channel, use of which is recommended in the country (area). Also, a number "0" is stored in a row corresponding to a channel that cannot be used in the country (area).

For example, in the column corresponding to the United States, since a number "2" is stored in rows corresponding to channel numbers "1," "6," and "11," use of channels having the channel numbers is recommended. On the other hand, since a number "0" is stored in a row corresponding to channel number "14," use of a channel having the channel number cannot be made in the United States.

Figure 3:
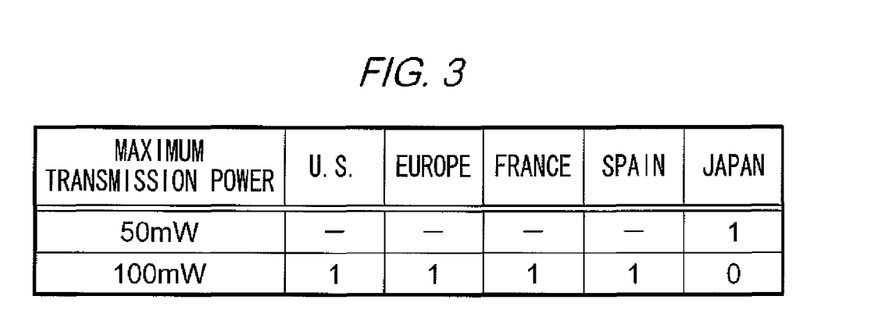
FIG. 3 is a diagram showing an example of a format of transmission power table TB2.

FIG. 3 is a diagram showing an example of a format of transmission power table TB2.

Transmission power table TB2 is a table that is referred to for setting an upper limit of transmission power that is used when second communication unit 108B performs wireless communication. In the column including information on maximum transmission power in the table, upper limits of transmission power that is used by second communication unit 108B for performing wireless communication are stored. Specifically, a value "50 mW" and a value "100 mW" are stored as a maximum transmission power. In the column including country (area) information, columns for the United States, Europe, Spain, France, and Japan are provided.

For example, in the column corresponding to the United States, since a number "1" is stored in a row corresponding to a value "100 mW," 100 mW is set as an upper limit for transmission power when second communication unit 108B performs wireless communication in the United States. On the other hand, in the column corresponding to Japan, since a number "1" is stored in a row corresponding to a value "50 mW," 50 mW is set as an upper limit for transmission power when second communication unit 108B performs wireless communication in Japan.

ROM 103 stores programs that are executed by CPU 102. Specifically, ROM 103 stores control programs for realizing a function of voice communication or data communication using a mobile communication network, a function of receiving an international roaming service from a mobile communication network, and a function of data communication using a wireless LAN.

The control programs are retrieved and executed by CPU 102, which has received power from a secondary battery (not shown), so that control of components of communication terminal 1 is performed. After the control programs are executed by CPU 102, functions of a mobile phone such as a function of voice communication or data communication using a mobile communication network, or a function of receiving an international roaming service are realized. Also, after the control programs are executed by CPU 102, a function of data communication using a wireless LAN, and a function of identifying a country in which communication terminal 1 is located and configuring a wireless LAN communication setting according to the identified country are realized.

Figure 4:
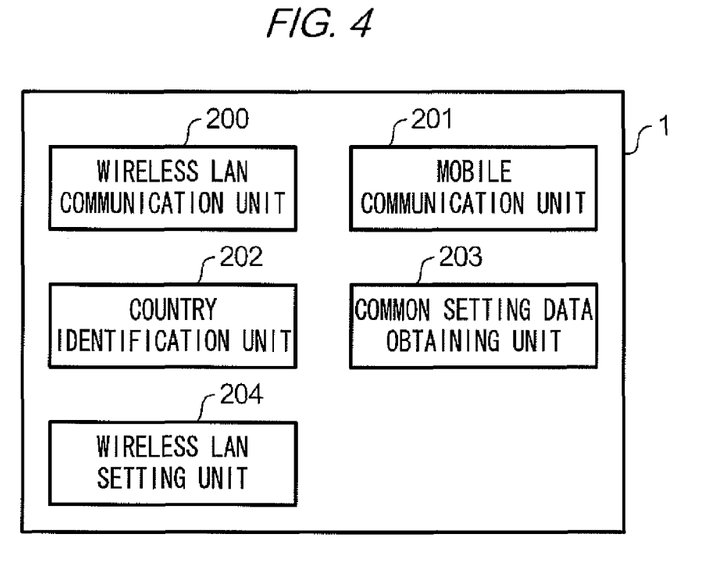
FIG. 4 is a block diagram showing a functional configuration of communication terminal 1.

FIG. 4 is a block diagram showing a part of functions realized in communication terminal 1.

After the control programs are executed by CPU 102, wireless LAN communication unit 200, mobile communication unit 201, country identification unit 202, common setting data obtaining unit 203, and wireless LAN setting unit 204, which are all shown in FIG. 4, are provided.

Wireless LAN communication unit 200 is a block that performs communication using a wireless LAN, and causes second communication unit 108B to perform data communication.

Mobile communication unit 201 is a block that performs communication using a mobile communication network, and causes first communication unit 108A to perform voice communication or data communication. Also, mobile communication unit 201 analyzes a signal received by first communication unit 108A from a wireless base station, and obtains an MCC transmitted from the wireless base station.

Country identification unit 202 is a block that identifies a country in which communication terminal 1 is located. Specifically, the unit identifies the country on the basis of an MCC obtained by mobile communication unit 201.

Common setting data obtaining unit 203 is a block that, if two MCCs are obtained by mobile communication unit 201, obtains setting values common to a country indicated by one MCC and a country indicated by the other MCC from frequency table TB 1 and transmission power table TB2.

Wireless LAN setting unit 204 is a block that controls second communication unit 108B depending on a country identified by country identification unit 202 so as to configure a frequency and transmission power of radio waves output by second communication unit 108B. If two MCCs are obtained by mobile communication unit 201, wireless LAN setting unit 204 configures second communication unit 108B on the basis of setting values obtained by common setting data obtaining unit 20

(Operation of Exemplary Embodiment)

An operation of the present exemplary embodiment will be described. In the description, it is assumed that a user having communication terminal 1 moves between European countries.

(Operation Performed when Communication Terminal 1 is Located in France)

Figure 5:
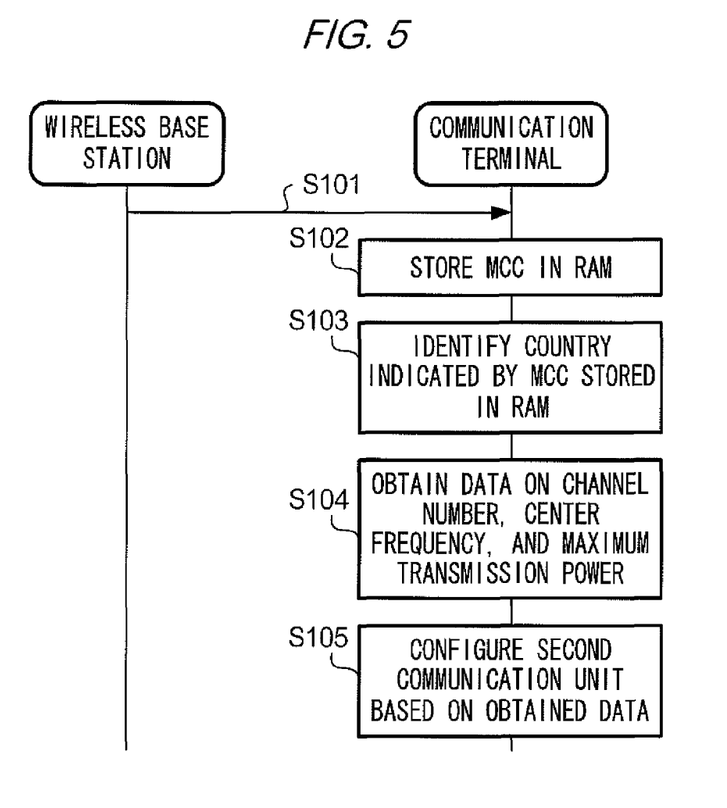
FIG. 5 is a diagram describing an operation of an exemplary embodiment.

When communication terminal 1 is located in Paris, France, first communication unit 108A receives an MCC transmitted from a wireless base station located in Paris (step S101 of FIG. 5). The MCC received by first communication unit 108A indicates that a country in which the wireless base station is located is France. After the MCC is received by first communication unit 108A, CPU 102 stores the MCC in RAM 104 (step S102).

Also, after the MCC is received by first communication unit 108A, CPU 102 monitors first communication unit 108A for a predetermined time period to check whether an MCC different from the MCC stored in RAM 104 is received. If the predetermined time period elapses, CPU 102 configures second communication unit 108B on the basis of the MCC stored in RAM 104.

Specifically, CPU 102 identifies a country indicated by the MCC stored in RAM 104. In this case, CPU 102 determines that the country is France (step S103). Subsequently, CPU 102 refers to a column corresponding to the country indicated by the MCC, in frequency table TB 1. In this case, since the country indicated by the MCC is France, the column corresponding to France is referred to. Subsequently, CPU 102 identifies a row in which a number "2" is stored, in the column corresponding to France in frequency table TB 1, and obtains values stored in the row; namely, channel number "11" and center frequency "2.462 GHz."

Also, CPU 102 refers to a column corresponding to the country indicated by the MCC, in transmission power table TB2. In this case, since the country indicated by the MCC is France, the column corresponding to France is referred to. Subsequently, CPU 102 identifies a row in which a number "1" is stored, in the column corresponding to France in transmission power table TB2, and obtains a value stored in the row; namely, maximum transmission power "100 mW" (step S104).

After data is obtained from each table, CPU 102 configures second communication unit 108B on the basis of the obtained data (step S105). In a case where CPU 102 retrieves data indicating center frequency "2.462 GHz" and data indicating maximum transmission power "100 mW," as described above, the CPU controls second communication unit 108B so as to set the center frequency and the upper limit of transmission power of radio waves that second communication unit 108B exchanges to perform communication, to "2.462 GHz" and "100 mW," respectively.

Thereafter, when communication terminal 1 communicates using a wireless LAN, CPU 102 controls second communication unit 108B to perform the communication. When the communication is performed, the center frequency of radio waves that second communication unit 108B exchanges is set to "2.462 GHz," and the upper limit of transmission power is set to "100 mW," as a result of the above configuration.

(Operation Performed when Communication Terminal 1 is Located near the Border between France and Spain)

An operation that is performed when communication terminal 1 is located near the border between France and Spain will now be described. When communication terminal 1 is located near the border between France and Spain, it is possible that first communication unit 108A receives a radio wave transmitted from a wireless base station located in France and a radio wave transmitted from a wireless base station located in Spain. In this situation, if first communication unit 108A receives an MCC transmitted from a wireless base station located in France (step S201 of FIG. 6), CPU 102 stores the MCC in RAM 104 (step S202).

Figure 6:
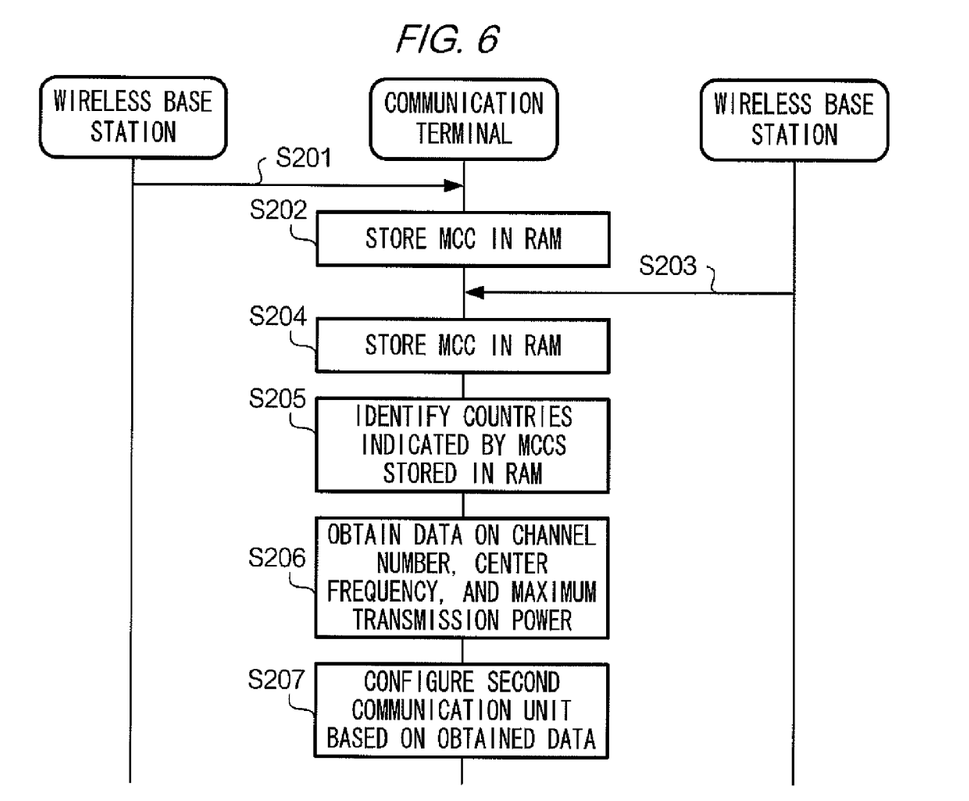
FIG. 6 is a diagram describing an operation of an exemplary embodiment.

After the MCC is received by first communication unit 108A, CPU 102 monitors first communication unit 108A for a predetermined time period to check whether an MCC different from the received MCC is received. If first communication unit 108A receives an MCC transmitted from a wireless base station located in Spain, during the time period (step S203), CPU 102 stores the MCC in RAM 104 (step S204).

After the two MCCs are stored in RAM 104, CPU 102 configures second communication unit 108B on the basis of the MCCs. Specifically, CPU 102 initially identifies countries indicated by the MCCs. In this case, CPU 102 determines that a country indicated by one of the MCCs is France, and a country indicated by the other MCC is Spain (step S205).

Subsequently, CPU 102 refers to the column corresponding to France and the column corresponding to Spain in frequency table TB1 on the basis of the result of the above determination. Specifically, in this case in which two MCCs are received, CPU 102 obtains a value common to the column corresponding to France and the column corresponding to Spain in frequency table TB1. In this case, in the column corresponding to France, a number "2" is stored in a row corresponding to channel number "11," and similarly in the column corresponding to Spain, a number "2" is stored in a row corresponding to channel number "11." Namely, channel number "11" is designated as a recommended channel in both countries. Accordingly, CPU 102 obtains a value indicating channel number "11" and a value indicating center frequency "2.462 GHz" from frequency table TB1.

Also, CPU 102 refers to the column corresponding to France and the column corresponding to Spain in transmission power table TB2. Specifically, CPU 102 obtains a value common to the column corresponding to France and the column corresponding to Spain in transmission power table TB2. In this case, in the column corresponding to France, a number "1" is stored in a row corresponding to maximum transmission power "100 mW," and in the column corresponding to Spain, a number "1" is similarly stored in a row corresponding to maximum transmission power "100 mW." Namely, maximum transmission power "100 mW" is commonly associated with both countries. Accordingly, CPU 102 obtains a value indicating maximum transmission power "100 mW" from transmission power table TB2.

After data is obtained from each table (step S206), CPU 102 configures second communication unit 108B on the basis of the obtained data (step S207). In a case where CPU 102 retrieves data indicating center frequency "2.462 GHz" and data indicating maximum transmission power "100 mW," as described above, the CPU controls second communication unit 108B so as to set the center frequency and the upper limit of transmission power of radio waves that second communication unit 108B exchanges to perform communication, to "2.462 GHz" and "100 mW," respectively.

Thereafter, when communication terminal 1 performs communication using a wireless LAN, CPU 102 controls second communication unit 108B to perform the communication. When the communication is performed, the center frequency of radio waves that second communication unit 108B exchanges is set to "2.462 GHz," and the upper limit of transmission power is set to "100 mW," as a result of the above configuration.

If such a configuration is performed to second communication unit 108B, and communication terminal 1 is located in an area in France adjacent to the border with Spain, the center frequency of radio waves that second communication unit 108B outputs is a frequency that can be used in France; namely, "2.462 GHz." Also, the upper limit of transmission power is a value that is permitted in France; namely, "100 mW." Accordingly, if a user uses communication terminal 1 to perform communication using a wireless LAN, the act does not violate a law in France.

Also, if the communication terminal is located in an area in Spain adjacent to the border with France, the center frequency of radio waves that second communication unit 108B outputs is a frequency that can be used in Spain; namely, "2.462 GHz." Also, the upper limit of transmission power is a value that is permitted in Spain; namely, "100 mW." Accordingly, if a user uses communication terminal 1 to perform communication using a wireless LAN, the act does not violate a law in Spain (Operation Performed when Communication Terminal 1 is Located near the Border between France and Germany An operation will be described, which is performed when communication terminal 1 is located near the border between France and Germany. When communication terminal 1 is located near the border between France and Germany, it is possible that first communication unit 108A receives a radio wave transmitted from a wireless base station located in France and a radio wave transmitted from a wireless base station located in Germany. In this situation, if first communication unit 108A receives an MCC transmitted from a wireless base station located in France, CPU 102 stores the MCC in RAM 104.

After the MCC is received by first communication unit 108A, CPU 102 monitors first communication unit 108A for a predetermined time period to check whether an MCC different from the received MCC is received. If first communication unit 108A receives an MCC transmitted from a wireless base station located in Germany, during the time period, CPU 102 stores the MCC in RAM 104.

After the two MCCs are stored in RAM 104, CPU 102 configures second communication unit 108B on the basis of the MCCs. Specifically, CPU 102 initially identifies countries indicated by the MCCs. In this case, CPU 102 determines that a country indicated by one of the MCCs is France, and a country indicated by the other MCC is Germany.

Subsequently, CPU 102 refers to the column corresponding to France and the column corresponding to Europe in frequency table TB 1 on the basis of the result of the above determination. In the present exemplary embodiment, if the country indicated by the MCC is a country of Europe other than France and Spain, CPU 102 refers to the column corresponding to Europe in each table. In this case, CPU 102 obtains a value common to the column corresponding to France and the column corresponding to Europe in frequency table TB1.

In this case, in the column corresponding to France, a number "2" is stored in a row corresponding to channel number "11;" on the other hand, in the column corresponding to Europe, a number "2" is stored in rows corresponding to channel numbers "1," "7," and "13." Namely, recommended channels for the two areas do not agree. However, in the column corresponding to Europe, a number "1" is stored in a row corresponding to channel number "11," and a channel having the channel number is commonly designated as a usable channel in both France and Europe (Germany). Accordingly, CPU 102 obtains a value indicating channel number "11" and a value indicating center frequency "2.462 GHz" from frequency table TB 1.

Also, CPU 102 refers to the column corresponding to France and the column corresponding to Europe in transmission power table TB2. Specifically, CPU 102 obtains a value common to the column corresponding to France and the column corresponding to Europe in transmission power table TB2. In this case, in the column corresponding to France, a number "1" is stored in a row corresponding to maximum transmission power "100 mW," and in the column corresponding to Europe, a number "1" is similarly stored in a row corresponding to maximum transmission power "100 mW." Namely, maximum transmission power "100 mW" is commonly associated with both areas. Accordingly, CPU 102 obtains a value indicating maximum transmission power "100 mW" from transmission power table TB2.

After data is obtained from each table, CPU 102 configures second communication unit 108B on the basis of the obtained data. In a case where CPU 102 retrieves data indicating center frequency "2.462 GHz" and data indicating maximum transmission power "100 mW," as described above, the CPU controls second communication unit 108B so as to set the center frequency and the upper limit of transmission power of radio waves that second communication unit 108B exchanges to perform communication, to "2.462 GHz" and "100 mW," respectively.

Thereafter, when communication terminal 1 performs communication using a wireless LAN, CPU 102 controls second communication unit 108B to perform the communication. When the communication is performed, the center frequency of radio waves that second communication unit 108B exchanges is set to "2.462 GHz," and the upper limit of transmission power is set to "100 mW," as a result of the above configuration.

If such a configuration is performed to second communication unit 108B, and communication terminal 1 is located in an area in France adjacent to the border with Germany, the center frequency of radio waves that second communication unit 108B outputs is a frequency that can be used in France; namely, "2.462 GHz." Also, the upper limit of transmission power is a value that is permitted in France; namely, "100 mW." Accordingly, if a user uses communication terminal 1 to perform communication using a wireless LAN, the act does not violate a law in France.

Also, if the communication terminal is located in an area in Germany adjacent to the border with France, the center frequency of radio waves that second communication unit 108B outputs is a frequency that can be used in Germany; namely, "2.462 GHz." Also, the upper limit of transmission power is a value that is permitted in Germany; namely, "100 mW." Accordingly, if a user uses communication terminal 1 to perform communication using a wireless LAN, the act does not violate a law in Germany.

As described in the foregoing, according to the present exemplary embodiment, if communication terminal 1 is located near a border, second communication unit 108B is configured so as to correspond to both countries adjacent to the border. Accordingly, violation of a law in either country is avoidable during performing of communication using a wireless LAN

[Modifications]

The present invention is not limited to the above exemplary embodiment, but may be implemented in other various embodiments. For example, the above exemplary embodiment may be modified as described below (it is to be noted that the following modifications may be combined with each other).

In the above exemplary embodiment, first communication unit 108A, when receiving an MCC from a wireless base station of a mobile communication network, may measure an electric field strength of a radio wave for sending the MCC, as communication quality data, and CPU 102 may store data indicating the electric field strength in association with data indicating the MCC.

If the present configuration is employed, and an MCC is received from both a wireless base station located in an area of a first country adjacent to a border, and a wireless base station located in an area of a second country adjacent to the same border, second communication unit 108B may be configured to correspond to a country indicated by an MCC associated with a higher electric field strength.

Figure 7:
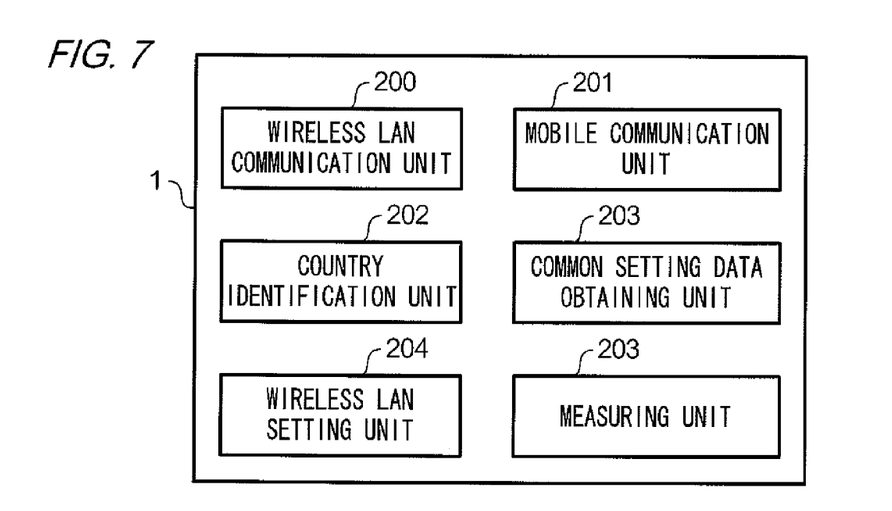
FIG. 7 is a block diagram showing a functional configuration of communication terminal 1 according to a modification of the present invention.

FIG. 7 is a block diagram showing functions realized in communication terminal 1 according to the present modification. As shown in the drawing, in the present modification, in addition to the functional blocks described in the above exemplary embodiment, measuring unit 205 is provided. Measuring unit 205 is a block that, when first communication unit 108A receives an MCC, measures a communication quality of a radio wave sent from a wireless base station. Measuring unit 205 specifically measures an electric field strength or an S/N ratio.

Figure 8:
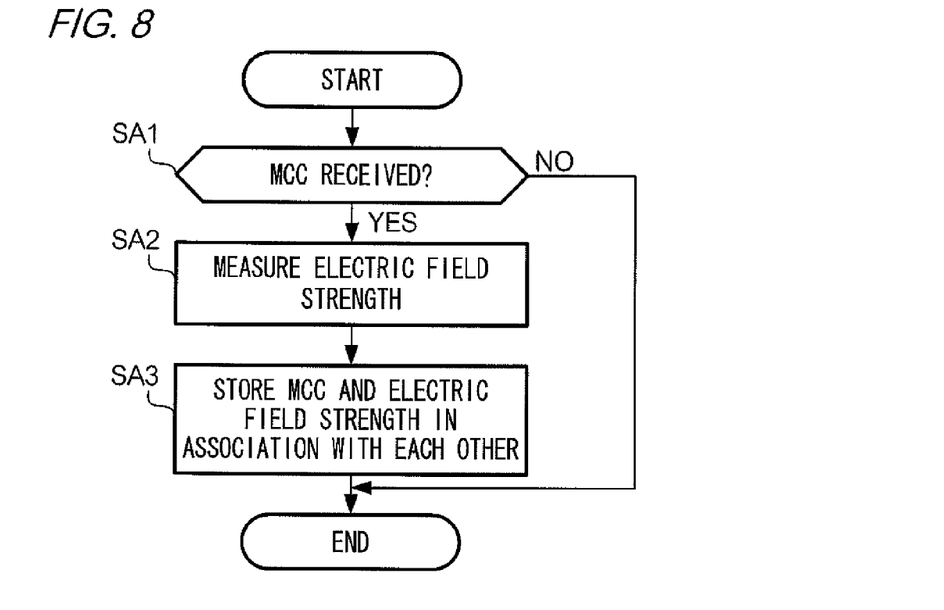
FIG. 8 is a flowchart showing a processing flow of communication terminal 1 according to a modification of the present invention.
Figure 9:
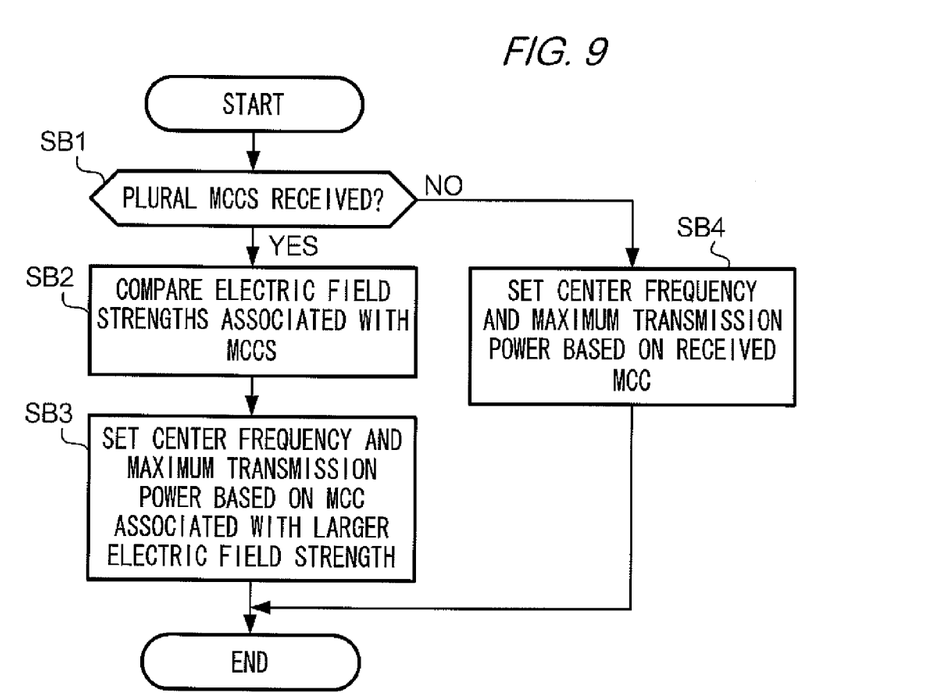
FIG. 9 is a flowchart showing a processing flow of communication terminal 1 according to a modification of the present invention.

FIGS. 8 and 9 are flowcharts showing a processing flow according to the present modification.

If it is assumed that communication terminal 1 is located near the border between France and Spain, and the communication terminal receives an MCC transmitted from a wireless base station located in France (step SA1 of FIG. 8; YES), first communication unit 108A measures an electric field strength of the radio wave transmitted from the wireless base station (step SA2), and CPU 102 stores data indicating the electric field strength in association with data indicating the MCC (step SA3).

If plural MCCs have been received (step SB1 of FIG. 9; YES), CPU 102 compares electric field strengths stored in association with the MCCs (step SB2), and if the electric field strength of the radio wave, which has been transmitted from a base station in France, is higher than that of a radio wave, which has been transmitted from a base station in Spain, CPU 102 refers to the column corresponding to France in frequency table TB1, and also refers to the column corresponding to France in transmission power table TB2 to set a center frequency and a maximum transmission power (step SB3). On the other hand, if plural MCCs have not been received (step SB1; NO), CPU 102 refers to frequency table TB1 and transmission power table TB2 on the basis of the received MCC to set a center frequency and a maximum transmission power (step SB4).

Figure 10:
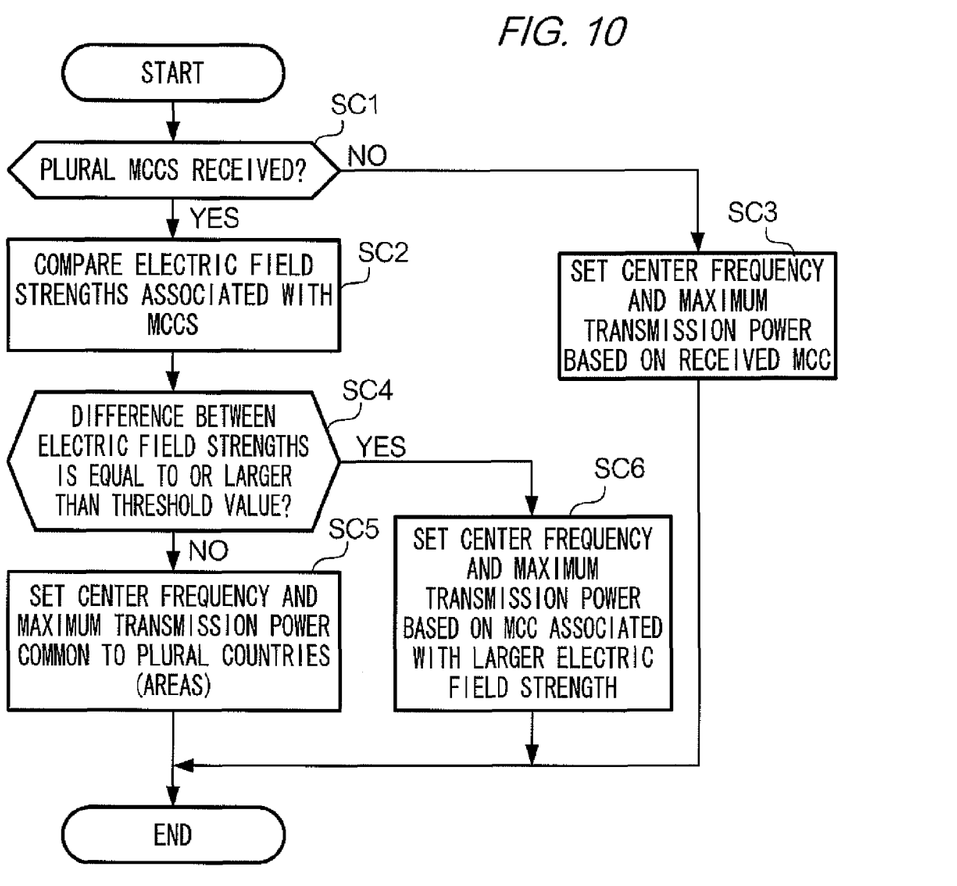
FIG. 10 is a flowchart showing a processing flow of communication terminal 1 according to a modification of the present invention.

It is to be noted that in the configuration where an electric field strength of a radio wave for sending an MCC is measured, an operation shown in FIG. 10 may be carried out. Specifically, if plural MCCs have been received (step SC1 of FIG. 10; YES), electric field strengths stored in association with the MCCs may be compared (step SC2), and if a difference between the electric field strength associated with one MCC, and the electric strength associated with the other MCC is equal to or larger than a predetermined value (step SC4; YES), second communication unit 108B may be configured so as to correspond to a country (area) indicated by the MCC associated with a higher electric field strength (step SC6).

If the difference between the electric field strength associated with one MCC, and the electric strength associated with the other MCC is smaller than the predetermined value (step SC4; NO), data common to the two countries (areas) may be obtained from each table, and second communication unit 108B may be configured on the basis of the data (step SC5), as in the case of the above exemplary embodiment.

If plural MCCs have not been received (step SC1; NO), CPU 102 may refer to frequency table TB1 and transmission power table TB2 on the basis of the received MCC, and set a center frequency and a maximum transmission power (step SC3).

It is to be noted that in the above configuration in which an electric field strength is measured, an S/N ratio may be measured instead of an electric field strength as communication quality data, and data indicating the S/N ratio may be stored in association with data indicating an MCC.

In this case, if an MCC is received from two countries around a boundary, and a difference between an S/N ratio associated with one MCC and an S/N ratio associated with the other MCC is equal to or larger than a predetermined value, second communication unit 108B may be configured so as to correspond to a country (area) indicated by an MCC associated with a higher S/N ratio.

If the difference between an S/N ratio associated with one MCC and an S/N ratio associated with the other MCC is smaller than the predetermined value, data common to the two countries (areas) may be obtained from each table, and second communication unit 108B may be configured on the basis of the data, as in the case of the above exemplary embodiment.

In the above exemplary embodiment, second communication unit 108B may perform communication in conformity with, not the IEEE 802.11b standard, but other standards such as the IEEE 802.11a/g/n standard.

Also, in the above exemplary embodiment, communication terminal 1 may download frequency table TB1 and transmission power table TB2 from a server connected to a mobile communication network or a server connected to a computer network connected to a mobile communication network, and store the tables in storage unit 105.

Alternatively, frequency table TB1 and transmission power table TB2 may be maintained in a server connected to a computer network connected to a mobile communication network. If the configuration is employed, communication terminal 1 sends a received MCC to the server, the server obtains data indicating a center frequency and data indicating a maximum transmission power from each table, as communication terminal 1 does in the above exemplary embodiment, and sends the obtained data to communication terminal 1. Subsequently, communication terminal 1 that receives the data configures second communication unit 108B on the basis of a center frequency and a maximum transmission power indicted by the received data.

What is claimed is:

1. A communication terminal comprising:
   a first communication unit that performs wireless communication with a wireless base station that is part of a mobile communication network to receive area data from the wireless base station, the area data indicating an area in which the wireless base station is located;
   a second communication unit that performs wireless communication using a band frequency different from a band frequency used for wireless communication performed by the first communication unit;
   a storage unit that stores, for each of a plurality of areas, setting data indicating a setting on wireless communication performed by the second communication unit in each area;
   a monitoring unit that in response to receipt of first area data by the first communication unit, monitors for a predetermined time whether second area data different from the first area data is received by the first communication unit;
   a first identifying unit that, if the second area data has not been received for the predetermined time, identifies a first area indicated by the first area data;
   an obtaining unit that obtains setting data associated with the first area from the storage unit;
   a second indentifying unit that, if the second area data has been received during the predetermined time, identifies the first area indicated by the first area data and a second area indicated by the second area data; and
   a common setting data obtaining unit that obtains setting data commonly associated with the first area and the second area identified by the second identifying unit, from the storage unit.

2. The communication terminal according to claim 1, further comprising a setting unit that configures wireless communication settings of the second communication unit, using the setting data obtained by the common setting data obtaining unit.

3. The communication terminal according to claim 1, further comprising:
   a measuring unit that measures a first communication quality of a radio wave that is transmitted when the first communication unit receives the first area data; and a second communication quality of a radio wave that is transmitted when the first communication unit receives the second area data; and
   a setting unit that:
   if a difference between the first communication quality and the second communication quality is smaller than a predetermined value, configuring wireless communication settings of the second communication unit, using the setting data obtained by the common setting data obtaining unit; and
   if the difference is equal to or greater than the predetermined value, obtaining setting data from the storage unit, that is associated with an area indicated by either the first area data or the second area data, that corresponds to a higher communication quality among the first communication quality and the second communication quality, and configuring wireless communication settings of the second communication unit, using the obtained setting data.

4. A method for controlling a communication terminal comprising:
   a first communication unit that performs wireless communication with a wireless base station that is part of a mobile communication network to receive area data from the wireless base station, the area data indicating an area in which the wireless base station is located;
   a second communication unit that performs wireless communication using a band frequency different from a band frequency used for wireless communication performed by the first communication unit; and
   a storage unit that stores, for each of a plurality of areas, setting data indicating a setting on wireless communication performed by the second communication unit in each area, the method comprising:

in response to receipt of first area data by the first communication unit, monitoring for a predetermined time whether second area data different from the first area data is received by the first communication unit;

if the second area data has not been received in the predetermined time, identifying a first area indicated by the first area data;

obtaining setting data associated with the first area from the storage unit;

if the second area data has been received during the predetermined time, identifying the first area indicated by the first area data and a second area indicated by the second area data; and obtaining setting data commonly associated with the identified first area and the identified second area from the storage unit.

5. The method according to claim 4, further comprising configuring wireless communication settings of the second communication unit, using the obtained setting data.

6. The method according to claim 4, further comprising:

measuring a first communication quality of a radio wave that is transmitted when the first communication that receives the first area data; and a second communication quality of a radio wave that is transmitted when the first communication unit receives the second area data;

if a difference between the first communication quality and the second communication quality is smaller than a predetermined value, configuring wireless communication settings of the second communication unit, using the obtained setting data; and if the difference is equal to or greater than the predetermined value, obtaining setting data from the storage unit, that is associated with an area indicated by either the first area data or the second area data, that corresponds to a higher communication quality among the first communication quality and the second communication quality, and configuring wireless communication settings of the second communication unit, using the obtained setting data.

* * * * *